United States Patent [19]

Bruce et al.

[11] Patent Number: 4,582,758

[45] Date of Patent: Apr. 15, 1986

[54] ROD MATERIAL FOR FISHING RODS

[76] Inventors: James Bruce, 60 High St.; Kenneth George Walker, Huntingdon Rd., both of Upwood, Huntingdon, Cambridgeshire, PE17 1QQ, United Kingdom

[21] Appl. No.: 666,008

[22] Filed: Oct. 29, 1984

[30] Foreign Application Priority Data

Oct. 27, 1983 [GB] United Kingdom ................. 8328699
May 2, 1984 [GB] United Kingdom ................. 8411248

[51] Int. Cl.[4] ............................................. A01K 87/00
[52] U.S. Cl. .................... 428/397; 43/18.1; 428/374; 428/398
[58] Field of Search ............... 428/397, 364, 373, 374, 428/398; 273/DIG. 3, 8, 15; 43/18.1, 18.5

[56] References Cited

U.S. PATENT DOCUMENTS

| 1,932,986 | 5/1931 | Powell | 43/18.1 |
| 3,995,092 | 12/1976 | Fuchs | 428/364 |
| 4,061,806 | 12/1977 | Lindler et al. | 43/18.5 |
| 4,083,140 | 4/1978 | Van Auken et al. | 43/18.5 |

Primary Examiner—Lorraine T. Kendell
Attorney, Agent, or Firm—Beveridge, Degrandi & Weilacher

[57] ABSTRACT

The disclosure relates to a fishing rod formed from one or more lengths of rod material each length of which has a polygonal cross-section such as a hexagon or pentagon. Each length is formed from a number of triangular section elements having a base part of a fibre reinforced plastics and an apex part of a rigid plastics foam. The triangular section elements are bonded together with the base parts forming the outer wall of the section and the apex parts forming an inner core to resist collapse of the section when it is heavily bowed.

16 Claims, 12 Drawing Figures

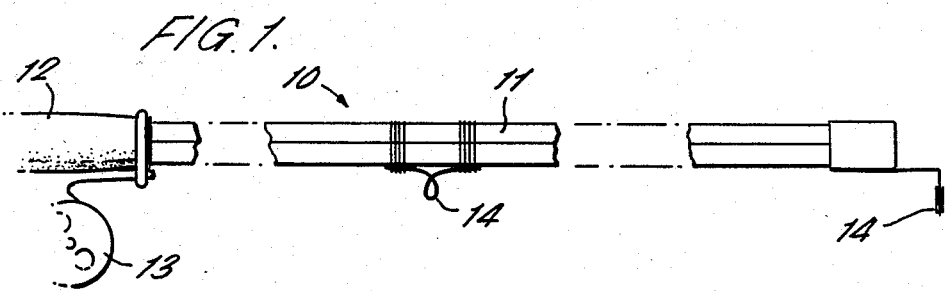
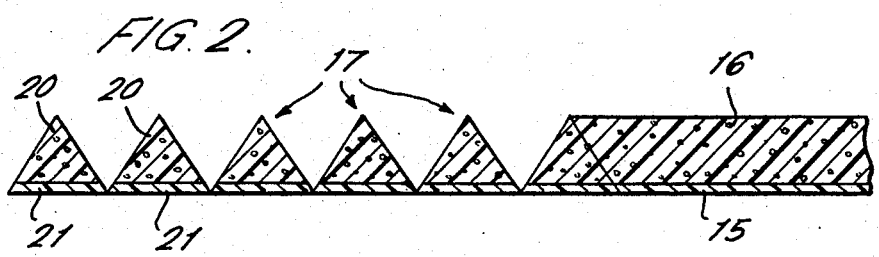
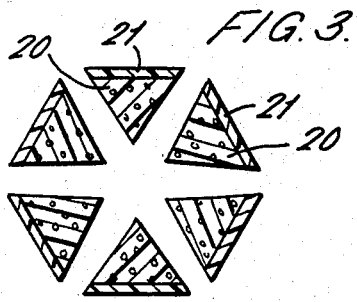
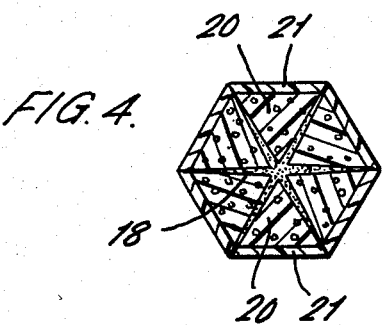

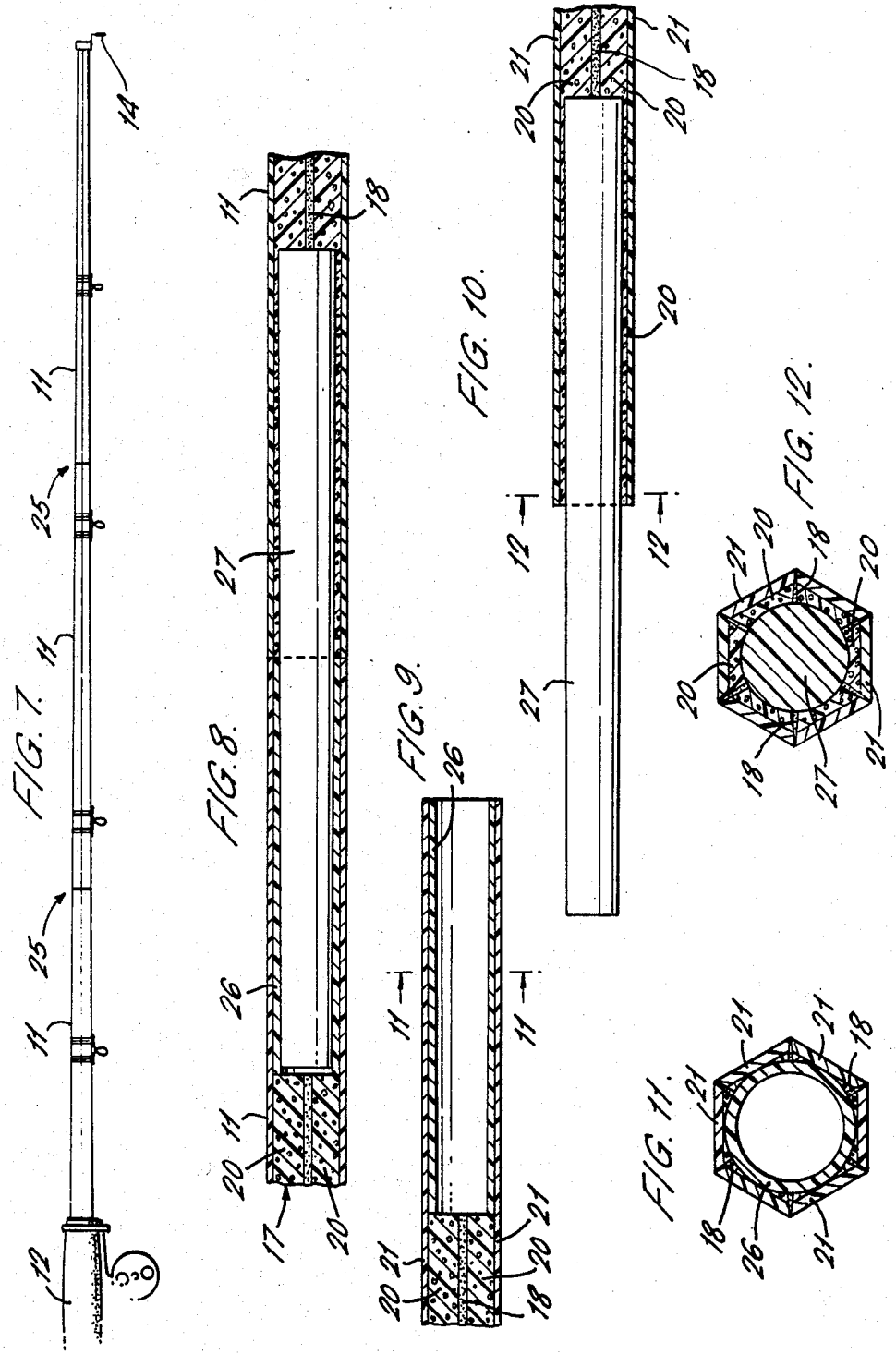

ROD MATERIAL FOR FISHING RODS

BACKGROUND OF THE INVENTION

1. Field of the Invention

This invention relates to rod material for fishing rods.

2. Prior Art

Fishing rods have been produced from hollow circular section carbon fibre reinforced plastics with some success but such rods can fail suddenly and without warning when heavily "bowed" due to the collapse of the cross-section rather than fracture as such of the tube.

SUMMARY OF THE INVENTION

The invention provides a rod material for a fishing rod comprising an elongate member having a polygonal cross-section formed from a plurality of generally triangular section elements each having a base part of fibre-reinforced plastics and an apex part of filler material bonded to the base, the triangular section elements being bonded together with their base parts forming an outer wall of the rod of polygonal form and their apex parts forming a core within the outer wall to support the tube against collapse when the tube is bowed.

In order to create a rod in which the stiffness reduces from one end to the other the triangular section elements may be tapered from end-to-end and the member is formed from said tapered elements with the larger section ends of the elements all at one end of the member and the smaller section ends of the elements all at the other end of the member whereby the member is tapered from one end to the other.

In a preferred form of the invention the section of the member is so formed that the bending stiffness of the member in one plane is less than the bending stiffness in the transverse plane so that the rod member tends to bend more in that plane as opposed to any other plane.

For example the bending stiffness of the rod material maybe reduced in said one plane by varying the stiffness of the elements of the rod member around the section.

Alternatively the bending stiffness of the rod material maybe reduced in said one plane by reducing the depth of the section in that plane as compared with the width of the section.

In any of the preceding arrangements the apex parts of the elements may be formed from expanded plastics material.

More specifically the apex parts of the elements maybe formed from expanded polyurethane.

Alternatively the apex parts of the elements maybe formed from balsa wood.

In any of the above arrangements the fibre reinforced plastics of the base parts of the elements maybe formed from fibre reinforced epoxy, phenolic or polyester resins.

Again in any of the above arrangements the fibres of the fibre reinforced plastic bases of the elements maybe laid both lengthwise of the elements and across the elements to lie both lengthwise and around the outer wall of the elongate member formed therefrom. The fibres of the fibre reinforced plastics base parts of the elements may comprise carbon, kevlar, boron or glass fibres.

In any of the above arrangements the triangular section elements maybe bonded together to form a pentagonal cross-section member.

Alternatively the triangular section elements maybe bonded together to form an elongate member of hexagonal cross-sectional shape.

The invention also provides a fishing rod formed from rod material according to any of the preceding arrangements in which joints between adjacent lengths comprise inset sleeves in one end of each length to receive dowels projecting from the other end of each length.

BRIEF DESCRIPTION OF THE DRAWINGS

FIG. 1 is a side view of part of a fishing rod;

FIG. 2 is a sectional view of a composite sheet from which rod material for the rod is produced;

FIG. 3 is an exploded view of the elements for making up the rod material;

FIG. 4 is a sectional view of a piece of the fishing rod material;

FIG. 7 is side view of a further for of rod made up of a number of tapered lengths of rod material and FIGS. 8 to 12 are sectional views through a joint in the rod of FIG. 7 illustrates its construction.

DESCRIPTION OF THE PREFERRED EMBODIMENTS

The sheet material is then cut lengthwise into triangular section elements 17, the angle of the apex part 20 of which, opposite the facet formed by the resin fibre reinforced base part 21, is just under 60 degrees. If the rod section is required to taper, the elements are cut to taper from one end to the other as required. Six such elements 17 are then bonded together with resin between their adjacent facets as illustrated in FIG. 4, the resin bonding layer 18 between adjacent elements being shown exaggerated for the purpose of illustration. The bonded sections thus form an outer tube of the carbon fibre reinforced plastics resin filled with the expanded polyurethane.

After curing, the rod section is cut to length and provided with the necessary fittings which are attached in conventional manner. Such rods may be single piece or of multiple sections in which case the sections are connected by ferrules or spliced joints in conventional manner.

It will be appreciated that many other materials may be used for forming the rod material as described above. For example the fibre reinforced plastic resin may be a phenolic or polyester resin. The fibres for reinforcing the resin may be carbon, Kevlar, boron or glass fibres. The expanded polyurethane filler may be the material sold under trade name ROHACELL 71. Alternatives to expanded polyurethane may be used as the filler material, for example other expanded plastics, balsa wood, or other light, strong material.

Figure 5:
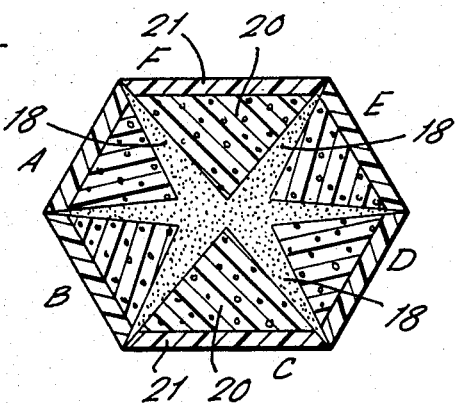
FIGS. 5 and 6 are similar views to FIG. 4 showing other sectional forms in accordance with the invention.

Referring now to FIG. 5 of the drawings, the hexagonal rod material illustrated is formed from materials generally similar to those described above. In order to cause a rod formed from the material to bend more in one plane as opposed to any other plane to provide greater accuracy and distance when casting, the stiffness of the section is reduced in said one plane. This may be achieved by stiffening the sides designated A, B, D and E in the illustration with a high modulus carbon leaving the sides F and C with a less stiff, lower modulus carbon. Alternatively the density of carbon or other reinforcement in the sides A, B, D and E may be increased or, correspondingly, the density in the carbon or other reinforcement in the sides F and C may be reduced. In a further arrangement, the sides designated F and C may be increased in length. All the above arrangements produce a rod material having a reduced stiffness in the plane 1—1. In a further arrangement, the sides F and C are reduced in length and the resulting rod has reduced stiffness in the plane 2—2.

Figure 6:
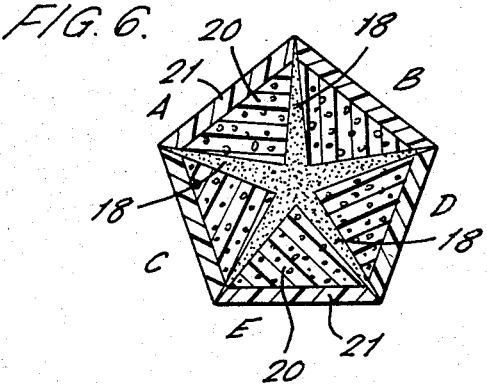

In the further embodiment illustrated in FIG. 6, a pentagon of form rod material is provided. By stiffening any four sides of the pentagon leaving one side less stiff, the rod material is provided with a plane of minimum stiffness which will lie in the section according to the location of the weaker side. Likewise the stiffness modulus of four sides of the pentagon may be increased leaving one side less stiff. In a further arrangement material may be removed from one side to make it less stiff by lengthening or shortening on one or more sides to provide a single plane of minimum stiffness.

It will be understood that the effects indicated above can be achieved whatever the stiffening fibre reinforcement provided in the plastics material of the rod and although carbon has been mentioned specifically, the arrangements are equally applicable to glass, boron or other kevlar stiffness. It will also be appreciated that provision of a plane in which the rod material has a minimum stiffness as compared with any other plane can also be achieved by other variations in shape and or material of the tubular rod.

It will be further understood that where a rod is required to be made up of a number of lengths of diminishing cross-section, as is normally the case, each part of the rod may be formed to have a reduced bending stiffness in one plane as compared with the other plane and the parts of the rod are then assembled with those plane in alignment so that the rod as a whole has a minimum bending stiffness in said plane as compared with any other plane.

Reference is now made to FIGS. 7 to 12 of the drawings which illustrate a further fishing rod constructed in accordance with the invention and comprising a plurality of lengths 11 of rod material each tapered from end to end to provide a fully tapered rod reducing from the maximum thickness adjacent the hand hold 12 to a minimum thickness at the tip eylet 14. The joints between adjacent lengths 11 or rod material are indicated at 25 and one of the joints 25 is illustrated in greater detail in cross-section in FIGS. 8 to 12 to which reference will now be made. The rod length 11 to one side of each joint is provided with a rigid plastic sleeve 26 fitted in the end part of the rod length 11. The sleeve is incorporated in the rod length during manufacture of the rod by cutting away the apex parts 20 of the triangular sections 17 making up the rod length and bonding the sleeve in place at the end of the rod length at the same time as bonding of the triangular sections 17 of the rod together. As best seen in FIG. 11, the outer diameter of the sleeve 26 is such that it just bears on the base part 21 of the sections making up the rod. The adjacent end of the other rod length 11 has a rigid plastics dowel 27 bonded in the end of the rod length and projecting therefrom as best seen in FIG. 10. A spigot 27 of one rod length is a close fit in the sleeve 26 of the other rod length as shown in FIG. 8 to form an externally smooth tight joint between the two rod lengths.

It will be appreciated that many modifications may be made to the above described embodiments without departing from the scope of the invention. For example, although pentagon and hexagon form rods have been described in detail, rods of other sections can be constructed from appropriately shaped triangular elements including triangular section rods, square section rods, seven, eight or more sided rods as required. It will also be understood that other fibre reinforcements may be used in the base parts of the triangular section elements to achieve the required stiffness/bending characteristics in the rod. For example, silicon-carbide fibres may be used in addition to or instead of the reinforcing fibres referred to specifically above.

We claim:

1. Rod material for a fishing rod comprising an elongate member having a polygonal cross-section formed from a plurality of generally triangular section elements each having a base part of fibre-reinforced plastics and an apex part of filler material bonded to the base, the triangular section elements being bonded together with their bases forming an outer wall of the rod of polygonal form and their apex parts forming a core within the outer wall to support the rod material against collapse when the rod material is bowed.

2. Rod material as claimed in claim 1 wherein the triangular section elements are tapered from end-to-end and the member is formed from said tapered elements with the larger section ends of the elements all at one end of the member and the smaller section ends of the elements all at the other end of the member whereby the member is tapered from one end to the other end.

3. Rod material as claimed in claim 1 wherein the polygonal cross-section is so formed that the bending stiffness of the member in one plane is less than the bending stiffness in the transverse plane so that the rod member tends to bend more in that plane as opposed to any other plane.

4. Rod material as claimed in claim 3 wherein the bending stiffness of the rod material is reduced in said one plane by varying the stiffness of the elements of the rod member around the polygonal cross-section.

5. Rod material as claimed in claim 3 wherein the bending stiffness of the rod is reduced in said one plane by reducing the depth of the polygonal cross-section in that plane as compared with the depth of the polygonal cross-section.

6. Rod material as claimed in claim 1 wherein the apex parts of the elements are formed from expanded plastics material.

7. Rod material as claimed in claim 6 wherein the apex parts of the elements are formed from expanded polyurethane.

8. Rod material as claimed in claim 1 wherein the apex parts of the elements are formed from balsa wood.

9. Rod material as claimed in claim 1 wherein the fibre reinforced plastics of the base parts of the elements are formed from fibre reinforced epoxy, phenolic or polyester resins.

10. Rod material as claimed in claim 1 wherein the fibres of the fibre reinforced plastic bases of the elements are laid both lengthwise of the elements and across the elements to lie both lengthwise and around the outer wall of the elongate member formed therefrom.

11. Rod material as claimed in claim 1 wherein the fibres of the fibre reinforced plastics base parts of the elements comprise carbon, kevlar, boron or glass fibres.

12. Rod material as claimed in claim 1 wherein triangular section elements are bonded together to form a pentagonal cross-section member.

13. Rod material as claimed in claim 1 wherein triangular section elements are bonded together to form an elongate member of hexagonal cross-sectional shape.

14. Rod material as claimed in claim 1 having an end with an inset sleeve adapted to receive a dowel in close fitting relationship.

15. Rod material as claimed in claim 1 having an end with a projecting dowel adapted to engage a sleeve in close fitting relationship.

16. Rod material as claimed in claim 1 having an end with an inset sleeve adapted to receive a dowel in close fitting relationship and an opposite end with a projecting dowel adapted to engage a sleeve in close fitting relationship.

* * * * *